(No Model.)
B. G. LAMME.
COMPOUND WOUND POLYPHASE GENERATOR.
No. 565,284.    Patented Aug. 4, 1896.
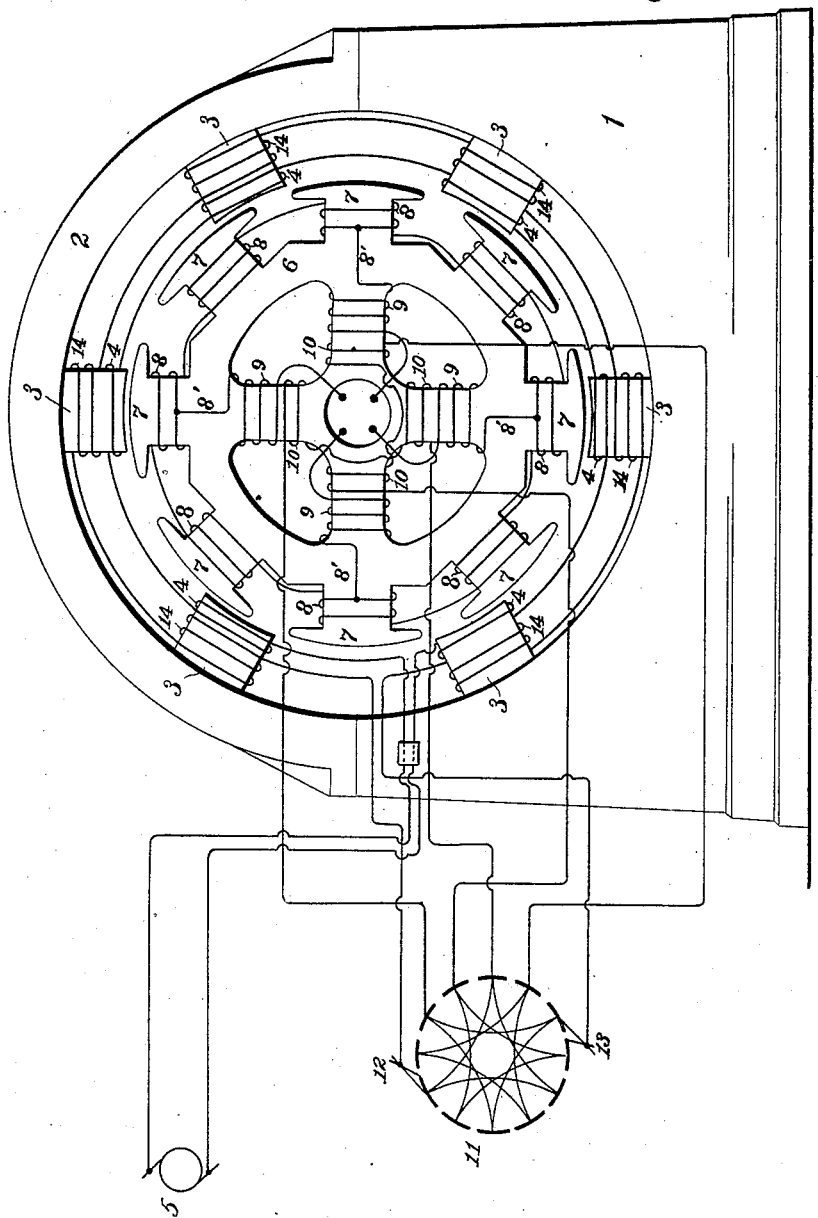
WITNESSES:
INVENTOR
B. G. Lamme
BY
Terry, MacKay & Carr
ATTORNEYS.

United States Patent Office.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

COMPOUND-WOUND POLYPHASE GENERATOR.

SPECIFICATION forming part of Letters Patent No. 565,284, dated August 4, 1896.

Application filed June 4, 1895. Serial No. 551,670. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Polyphase Alternating-Current Generators, (Case No. 643,) of which the following is a specification.

My invention relates to polyphase alternating-current generators, and more particularly to that class of machines in which the field-magnets are provided with two sets of coils, one of which is separately excited and the other of which is excited by means of current derived from the machine itself.

My invention has for its object to provide a method and means whereby a smooth direct current may be derived from the machine for compounding its field in such a manner that each main circuit does its own share of the compounding and whereby certain other improved results may be effected in the operation of the machine.

In the accompanying drawing, which illustrates, diagrammatically, a generator embodying my invention, 1 is the base, and 2 the upper portion, of the frame of the machine, the two constituting the field-magnet provided with the usual pole-pieces 3. These pole-pieces 3 are shown in the present instance as six in number, but any other number desired may obviously be employed.

4 are the field-magnet-energizing coils comprised in one set or circuit and connected with any suitable direct-current generator 5, as shown.

6 is the armature, provided with eight radial pole-pieces 7.

8 are the main generating armature-coils wound upon the radiating-poles 7 and connected to form a single closed circuit. Connected to this closed generating-circuit at four equidistant points are the leads 8', such connection being suitable for the derivation of two-phase currents for the work-circuits. It will be understood, however, that the connections might be made at a different number of equidistant points in such manner as to secure currents of a different number of phases. The arrangement and combination of field-magnet and armature poles and circuits thus far described are described and claimed in my application, Serial No. 509,502, filed April 30, 1894, and need not be here more fully set forth.

The armature 6 is provided with four arms or spokes around which are wound the coils, which, as shown, are connected directly in series respectively with the leads 8', it being apparent from this construction that the current derived from the armature generating-coils 8 will traverse these coils 9 upon the armature-spokes in passing to the main-line circuits. I also wind upon the armature spokes or arms coils 10, one set for each pair of spokes, in such a manner that currents will be induced therein by the main-line currents traversing the coils 9. These coils 10 are connected to a commutator 11, which has twice as many bars or segments as the field-magnet has poles. The commutator-brushes 12 and 13 are connected with a second set of exciting or energizing coils 14 on the field-magnet pole-pieces 3.

It will be readily seen that with this structure and arrangement of apparatus two secondary currents differing in phase by ninety degrees will be induced in the coils 10, and that these currents will be combined and rectified by means of the commutator shown, so as to give an approximately smooth direct current, which is what is desired in practice for compounding the field of the generator.

It will be readily understood that the invention is equally applicable to a different number of phases than that described, and also that the induced currents may be produced by means of primary and secondary coils wound upon separate independent cores instead of upon the arms or spokes of the armature, if desired, the result being substantially the same in both cases. The coils have been illustrated and described as wound upon the armature-spokes, for the reason that this is the simplest and most inexpensive arrangement in practice. This means of securing a proper direct current for compounding the field of the generator is particularly desirable and advantageous for the reason that each main circuit does its share of the compounding, and also for the reason that if it were attempted to compensate the main currents instead of the secondary currents there would be great liability of getting the different circuits together accidentally or otherwise.

While I have described a special form of generator, it is obvious that the structure and arrangement of the several parts may be widely varied without departing from my invention, and I do not desire to limit my invention to any special type of either field-magnet or armature.

I claim as my invention—

1. The method of compounding the field of a polyphase-alternating-current generator which consists in producing by induction an independent secondary current corresponding to each phase of primary armature-current, combining and rectifying such secondary currents and exciting the field-magnet coils therewith, substantially as described.

2. In a polyphase-alternating-current generator, the combination with the field-magnet having a set of separately-excited coils, of an armature provided with generating-coils in inductive relation to the field-magnet coils and with coils respectively in circuit with the leads for the different phases of current, secondary coils in inductive relation to the said last-named coils only, means for combining and rectifying the currents from said secondary coils and a second set of field-magnet coils excited by said rectified currents, substantially as described.

3. A polyphase-alternating-current generator having an armature provided with coils traversed by the currents from the main generating-coils and non-inductively related thereto, secondary coils in inductive relation to said first-named coils only, means for combining and rectifying the secondary currents, and field-magnet coils energized by said rectified currents, substantially as described.

4. In a polyphase-alternating-current generator, the combination with a multiphase armature having arms or spokes, primary coils on said arms and connected to the main armature-coils, secondary coils on said arms, a commutator connected therewith and field-magnet coils energized by the current from said commutator, substantially as described.

5. A polyphase-alternating-current generator having an armature provided with main generating-coils, a second set of coils traversed by the currents generated therein by induction from said second set, in combination with a multipolar field-magnet having two sets of energized coils, a commutator having twice as many segments as the field-magnet has poles and circuit connections between the secondary armature-coils and said segments and between the commutator-brushes and one set of field-magnet coils, substantially as described.

In testimony whereof I have hereunto subscribed my name this 30th day of May, A. D. 1895.

BENJAMIN G. LAMME.

Witnesses:
WESLEY G. CARR,
H. C. TENER.